United States Patent
Yang (10) Patent No.: US 10,699,096 B2
(45) Date of Patent: Jun. 30, 2020

(54) FINGERPRINT IDENTIFICATION SYSTEM

(71) Applicant: SHENZHEN GOODIX TECHNOLOGY CO., LTD., Guangdong (CN)

(72) Inventor: Meng-Ta Yang, Taipei (TW)

(73) Assignee: SHENZHEN GOODIX TECHNOLOGY CO., LTD., Guangdong (CN)

( * ) Notice: Subject to any disclaimer, the term of this patent is extended or adjusted under 35 U.S.C. 154(b) by 63 days.

(21) Appl. No.: 16/055,617

(22) Filed: Aug. 6, 2018

(65) Prior Publication Data

US 2018/0349668 A1 Dec. 6, 2018

Related U.S. Application Data

(63) Continuation of application No. PCT/CN2016/112189, filed on Dec. 26, 2016.

(51) Int. Cl.
*G06K 9/28* (2006.01)
*G06K 9/00* (2006.01)
(Continued)

(52) U.S. Cl.
CPC ........... *G06K 9/0002* (2013.01); *G06F 3/044* (2013.01); *G06F 3/0412* (2013.01); *G06F 3/0416* (2013.01)

(58) Field of Classification Search
CPC ............ G06K 9/0002; G06K 9/00006–9/0012
See application file for complete search history.

(56) References Cited

U.S. PATENT DOCUMENTS 5,325,442 A * 6/1994 Knapp ................... G01B 7/004
361/278
8,593,160 B2 11/2013 Thompson et al.
(Continued)

FOREIGN PATENT DOCUMENTS

CN 101226593 7/2008
CN 104423694 A 3/2015
(Continued)

OTHER PUBLICATIONS

Meettechniek.info, "Measuring capacitance :: Electronic Measurements", downloaded from https://meettechniek.info/passive/capacitance.html and Dec. 13, 2019, pp. 1-7, Last Modification: Jan. 20, 2014, no author listed. (Year: 2014).*
(Continued)

*Primary Examiner* — Brian Werner
(74) *Attorney, Agent, or Firm* — WPAT, P.C., Intellectual Property Attorneys; Anthony King (57) ABSTRACT

The disclosure provides a fingerprint identification system, which is formed in an integrated circuit. The fingerprint identification system includes: a pixel array circuit; a first peripheral top electrode; a first capacitive sensing circuit for sensing a capacitance associated with the first peripheral top electrode in a sleep mode and for generating a sensing result; and a logic control circuit for generating the control signal according to the sensing result. When the sensing result shows that the first peripheral top electrode is touched by a finger, the control signal is generated by the logic control circuit so that the pixel array circuit is switched from the sleep mode to the normal operation mode.

16 Claims, 8 Drawing Sheets

(51) Int. Cl.
*G06F 3/041* (2006.01)
*G06F 3/044* (2006.01)

(56) References Cited

U.S. PATENT DOCUMENTS

| | | | |
|---|---|---|---|
| 9,891,255 B2* | 2/2018 | Wang | G06F 3/044 |
| 2008/0030302 A1* | 2/2008 | Franza | G06K 9/00006 340/5.83 |
| 2015/0071511 A1 | 3/2015 | Wang | |
| 2016/0292488 A1 | 10/2016 | Ran et al. | |
| 2016/0364596 A1* | 12/2016 | Zhan | G06K 9/0002 |

FOREIGN PATENT DOCUMENTS

| | | |
|---|---|---|
| CN | 104463082 | 3/2015 |
| CN | 104463082 A | 3/2015 |
| CN | 104600200 A | 5/2015 |
| CN | 105224139 A | 1/2016 |
| CN | 105631402 | 6/2016 |
| CN | 105631402 A | 6/2016 |
| WO | WO2016055007 A1 | 4/2016 |
| WO | WO-2016074443 A1 * | 5/2016 ........... G06K 9/0002 |

OTHER PUBLICATIONS

English abstract translation of CN104463082.
English abstract translation of CN105631402.
English abstract translation of CN101226593.
International Search Report for PCT/CN2016/112189.
Written Opinion of the International Searching Authority for PCT/CN2016/112189.
Search Report dated Feb. 25, 2019 issued by the European Patent Office for counterpart application No. 16925153.5.
Office Action and Search Report dated Jul. 29, 2019 issued by China National Intellectual Property Administration for counterpart application 201680002049.8.
English Abstract Translation of Foreign Document No. CN104423694A.
English Abstract Translation of Foreign Document No. CN104463082A.
English Abstract Translation of Foreign Document No. CN105224139A.
English Abstract Translation of Foreign Document No. CN105631402A.
English Abstract Translation of Foreign Reference CN104600200A.

* cited by examiner

FINGERPRINT IDENTIFICATION SYSTEM

CROSS-REFERENCE TO RELATED APPLICATION

This application is a continuation of international application PCT/CN2016/112189, filed on Dec. 26, 2016, which is incorporated by reference in its entirety.

TECHNICAL FIELD

The present disclosure relates to a fingerprint identification system, and in particular, to a fingerprint identification system with a small circuit area, low cost and low power consumption.

BACKGROUND

With the rapid development in science and technology, more and more portable electronic devices such as mobile phones, digital cameras, tablet computers, and notebook computers or the like have become essential tools in people's lives. Since portable electronic devices are generally used by individuals and have certain privacy, data stored inside the electronic devices (such as phone books, photos, personal information) is privately owned. Once the electronic device is lost, the data may be used by others, causing unnecessary losses. Although password protection has been used to prevent the electronic device from being used by others, passwords may be easily leaked or cracked, thus having a low degree of security. Moreover, the user has to remember the passwords so that the electronic device can be used. If the passwords are forgotten, a lot of inconveniences are brought to the user. Therefore, a personal fingerprint identification system has been developed for the purpose of identity verification so as to improve data security.

A pixel array circuit is used in a fingerprint identification system to sense contact of a finger, and the capacitance between the pixel array circuit and the finger is converted by the pixel array circuit into a pixel output signal. Since the pixel output signal is an analog signal, the pixel output signal needs to be converted into a digital signal before being transmitted to a fingerprint determination module at the back end to determine whether the pixel array circuit corresponds to a finger ridge or a finger valley of the fingerprint. In the fingerprint identification system, the power consumption of the pixel array circuit is large when a fingerprint is captured. Generally, the pixel array circuit is usually in a sleep mode, and it will enters the normal operation mode to perform fingerprint identification only when it is touched by user's finger, thereby achieving the effect of power saving.

Therefore, how to determine whether the pixel array circuit is touched by user's finger has become one of goals to be achieved in the industry.

SUMMARY

In view of the above, a main object of some embodiments of the present disclosure is to provide a fingerprint identification system with a small circuit area, low cost and low power consumption, so as to alleviate the disadvantages in the prior art.

The present disclosure provides fingerprint identification system, formed in an integrated circuit, the fingerprint identification system includes: a pixel array circuit, wherein the pixel array circuit is switched to a normal operation mode in response to a control signal; a first peripheral top electrode, arranged at a first side of the pixel array circuit; a first capacitive sensing circuit, coupled to the first peripheral top electrode, the first capacitive sensing circuit being used for sensing capacitance associated with the first peripheral top electrode in a sleep mode and generating a sensing result; and a logic control circuit, coupled to the first capacitive sensing circuit, the logic control circuit being used for generating the control signal according to the sensing result; wherein when the sensing result indicates that the first peripheral top electrode is touched by a finger, the logic control circuit generates the control signal, and the pixel array circuit is switched from the sleep mode into the normal operation mode accordingly; wherein in the normal operation mode, the pixel array circuit performs fingerprint identification with respect to a finger.

BRIEF DESCRIPTION OF THE DRAWINGS

One or more embodiments are exemplarily illustrated in combination with the respective figures in the accompanying drawings, and the exemplary illustration should not be construed as limiting the embodiments. Elements having the same reference numerals in the drawings are similar elements, unless specifically stated otherwise, and the figures in the accompanying drawings are not drawn to scale.

DETAILED DESCRIPTION OF THE EMBODIMENT(S)

In order to make the objects, technical solutions and advantages of the disclosure clearer and more apparent, the disclosure will be further described below in detail with reference to the embodiments and the accompanying drawings. It should be noted that the specific embodiments described herein are merely used to explain the disclosure, and are not intended to limit the disclosure.

A fingerprint identification system is provided according to the present disclosure, which is capable of awakening a pixel array circuit of the fingerprint identification system from a sleep mode. A layer of peripheral top electrodes is overlaid on a peripheral circuit around the pixel array circuit, and capacitances of the peripheral top electrodes are sensed. A control signal will be generated by the fingerprint identification system when a sensing result shows that the peripheral top electrodes are touched by the user, so as to awaken the pixel array circuit.

Figure 1:
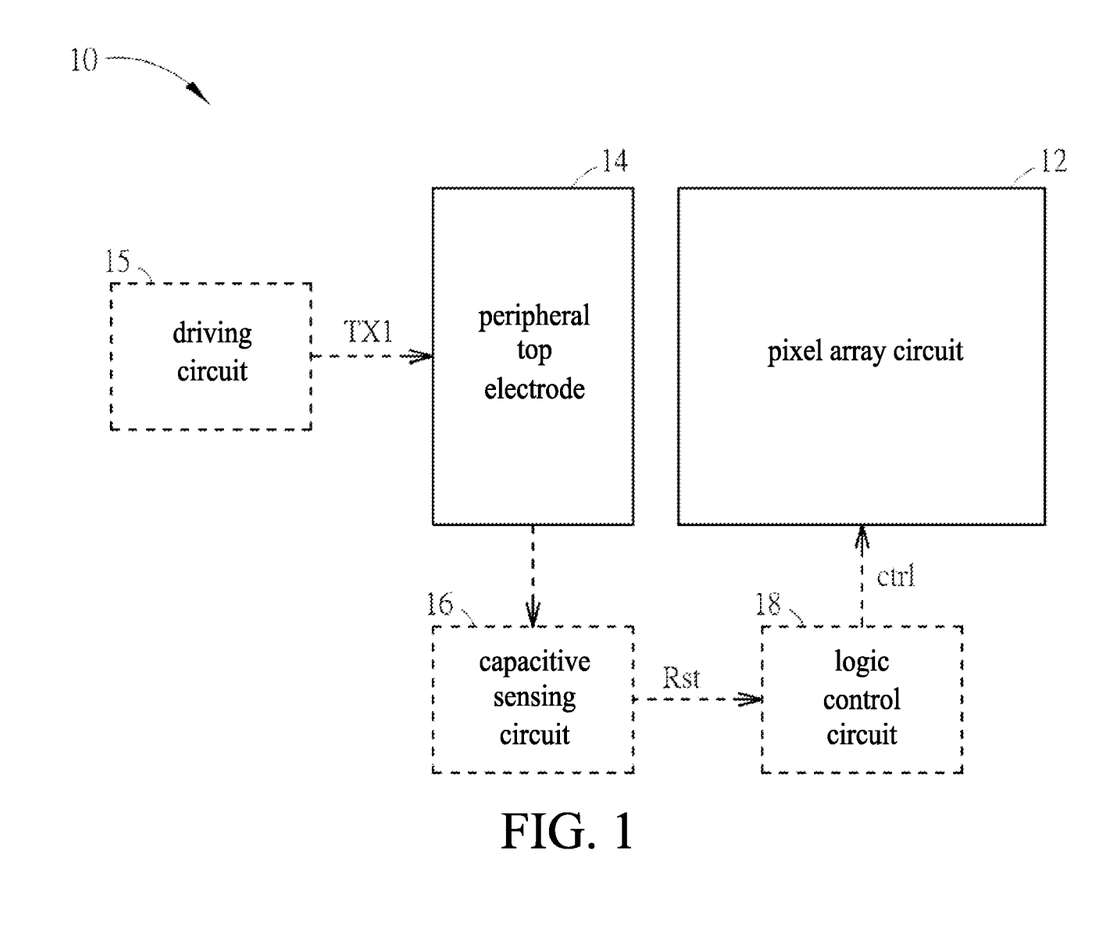
FIG. 1 is a schematic top view of a circuit layout of a fingerprint identification system according to an embodiment of the present disclosure.
Figure 2:
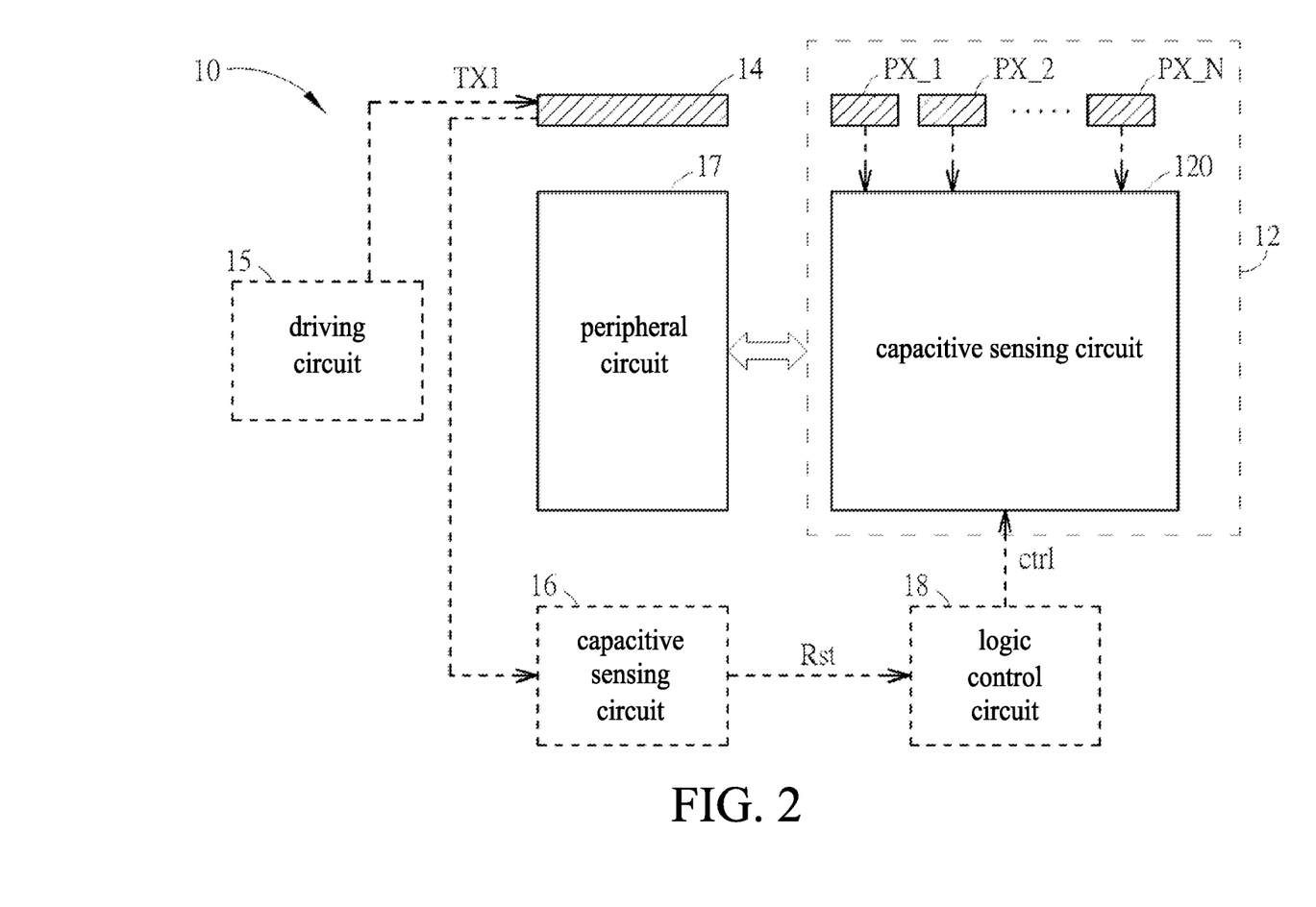
FIG. 2 is a schematic side view of the circuit layout of the fingerprint identification system shown in FIG. 1.

To elaborate, reference is made to FIG. 1 and FIG. 2, wherein FIG. 1 is a schematic top view of a circuit layout of a fingerprint identification system 10 according to an embodiment of the present disclosure, and FIG. 2 is a schematic side view of the circuit layout of the fingerprint identification system 10. The fingerprint identification system 10 may be formed in an integrated circuit, and includes a pixel array circuit 12, a peripheral top electrode 14, a driving circuit 15, a capacitive sensing circuit 16, a peripheral circuit 17, and a logic control circuit 18. The pixel array circuit 12 is used to receive contact of a user's finger and to sense contact capacitances between the pixel array circuit 12 and the finger so as to perform fingerprint identification. In order to realize the effect of power saving, the pixel array circuit 12 is usually in a sleep mode, and the pixel array circuit 12 can be awakened to enter the normal operation mode and perform fingerprint identification on the user's finger only when the user intends to use the pixel array circuit 12 to perform fingerprint identification. Specifically, the pixel array circuit 12 may be controlled by a control signal ctrl, and it is determined whether the pixel array circuit 12 should be switched from the sleep mode to the normal operation mode in response to the control signal ctrl. In addition, the peripheral top electrode 14 is arranged on one side of the pixel array circuit 12, and the peripheral top electrode 14 may be the uppermost metal (top metal) layer in the integrated circuit layout. The capacitive sensing circuit 16 is coupled to the peripheral top electrode 14, and used for sensing the capacitance of the peripheral top electrode 14 in the sleep mode, so as to determine whether the peripheral top electrode 14 is touched by a finger and to generate a sensing result Rst. The logic control circuit 18 is coupled to the capacitive sensing circuit 16, and is used for generating the control signal ctrl according to the sensing result Rst. That is, when the sensing result Rst shows that the peripheral top electrode 14 is touched by the finger, the control signal ctrl is generated by the logic control circuit 18 so that the pixel array circuit 12 is switched from the sleep mode to the normal operation mode.

Further, the pixel array circuit 12 includes pixel top electrodes PX_1 to PX_N and a capacitive sensing circuit 120. The pixel top electrodes PX_1 to PX_N are located in the uppermost layer of the circuit layout of the fingerprint identification system 10 (that is, the pixel top electrodes PX_1 to PX_N are also the uppermost metal layer in the integrated circuit layout), and are used for receiving contact of a finger. The pixel top electrodes PX_1 to PX_N may be arranged in an array. The capacitive sensing circuit 120 is coupled to the pixel top electrodes PX_1 to PX_N, and used for sensing the contact capacitances between the finger and the pixel top electrodes PX_1 to PX_N in the normal operation mode, so that the fingerprint identification system 10 can determine whether each pixel top electrode PX_n of the pixel top electrodes PX_1 to PX_N corresponds to a finger ridge or a finger valley of the finger according to the sensing result of the capacitive sensing circuit 120, and generate a fingerprint identification result corresponding to the finger. In addition, after the fingerprint identification result is generated by the fingerprint identification system 10 in the normal operation mode, the control signal ctrl may be generated by the logic control circuit 18 so that the pixel array circuit 12 is switched from the normal operation mode to the sleep mode. In an embodiment, the capacitive sensing circuit 120 is in a disabled state in the sleep mode, whereas the capacitive sensing circuit 120 is in an enabled state in the normal operation mode. In other words, after the fingerprint identification result is generated by the fingerprint identification system 10 in the normal operation mode, the logic control circuit 18 may generate the control signal ctrl so that the capacitive sensing circuit 120 is switched from the enabled state (normal operation mode) to the disabled state (sleep mode).

In addition, in the sleep mode (that is, when the capacitive sensing circuit 120 is in the disabled state), the capacitance between the peripheral top electrode 14 and a ground terminal may be sensed by the capacitive sensing circuit 16. In an embodiment, a driving signal TX1 can be generated for the peripheral top electrode 14 by the fingerprint identification system 10 using the driving circuit 15 at a first time in the sleep mode, and the capacitance between the peripheral top electrode 14 and the ground terminal may be sensed by the capacitive sensing circuit 16 at a second time in the sleep mode, and accordingly a sensing result Rst is generated. At this point, the logic control circuit 18 can determine whether the peripheral top electrode 14 is touched by the finger according to the sensing result Rst, and further generate the control signal ctrl according to the determination result. The sensing result Rst may be a voltage signal or a current signal.

In addition, the peripheral top electrode 14 may be located at the periphery of the pixel array circuit 12, and may be overlaid above the peripheral circuit 17 (that is, the peripheral circuit 17 is arranged below the peripheral top electrode 14). The peripheral circuit 17 is arranged at the periphery of the pixel array circuit 12, and can power the pixel array circuit 12 or perform data acquisition on the pixel array circuit 12. For example, the peripheral circuit 17 may include, but is not limited to, a serial peripheral interface (SPI) bus circuit or a low dropout regulator (LDO) circuit.

It should be noted that in FIG. 1, only the pixel array circuit 12 and the peripheral top electrode 14 are denoted by solid lines, whereas all of the driving circuit 15, the capacitive sensing circuit 16, the peripheral circuit 17 and the logic control circuit 18 are denoted by dashed lines. It means that the pixel array circuit 12 and the peripheral top electrode 14 have the uppermost metal layer, whereas the driving circuit 15, the capacitive sensing circuit 16, the peripheral circuit 17 and the logic control circuit 18 may be arranged in different layout areas than the pixel array circuit 12 (and the peripheral top electrode 14). Alternatively, the actual circuit layout of the driving circuit 15, the capacitive sensing circuit 16, the peripheral circuit 17 and the logic control circuit 18 may be arranged below the pixel top electrodes PX_1 to PX_N or the peripheral top electrode 14 (as shown in FIG. 2). In other words, in the top view of the circuit layout of the fingerprint identification system 10, at least the peripheral top electrode 14 and the pixel top electrodes PX_1 to PX_N of the pixel array circuit 12 are visible (since both the peripheral top electrode 14 and the pixel top electrodes PX_1 to PX_N are in the uppermost metal layer), and the actual circuit layout of the driving circuit 15, the capacitive sensing circuit 16, the peripheral circuit 17 and the logic control circuit 18 may be varied as actually required.

In brief, the fingerprint identification system 10 of the disclosure is usually in the sleep mode. When the user intends to perform fingerprint identification, the user presses his/her finger on the pixel array circuit 12, so the finger of the user will inevitably couple to the peripheral top electrode 14, and thus the capacitance between the peripheral top electrode 14 and the ground terminal will be changed. The capacitance change of the peripheral top electrode 14 can be sensed by the capacitive sensing circuit 16, and a sensing result Rst is generated accordingly. When the sensing result Rst shows that the fingerprint identification system 10 is touched by a finger, the control signal ctrl is generated by the logic control circuit 18 so that the pixel array circuit 12 is switched from the sleep mode to the normal operation mode.

In addition, additional elements (such as electrodes located outside and surrounding the integrated circuit where the fingerprint identification system is arranged, which may be metal rings) are used in the prior art to detect whether the fingerprint identification system is touched by the user's finger. By contrast, in the present disclosure, whether the fingerprint identification system is touched by the user's finger can be detected by only using the peripheral top electrode overlaid on the peripheral circuit and formed in the integrated circuit without the need for additional circuit layout area (only the circuit layout area occupied by the peripheral circuit is reused), and the effect of detecting whether the fingerprint identification system is touched by the user's finger can be realized without additional elements such as metal rings. In other words, the present disclosure has advantages of small circuit area, low cost, and low power consumption.

Figure 3:
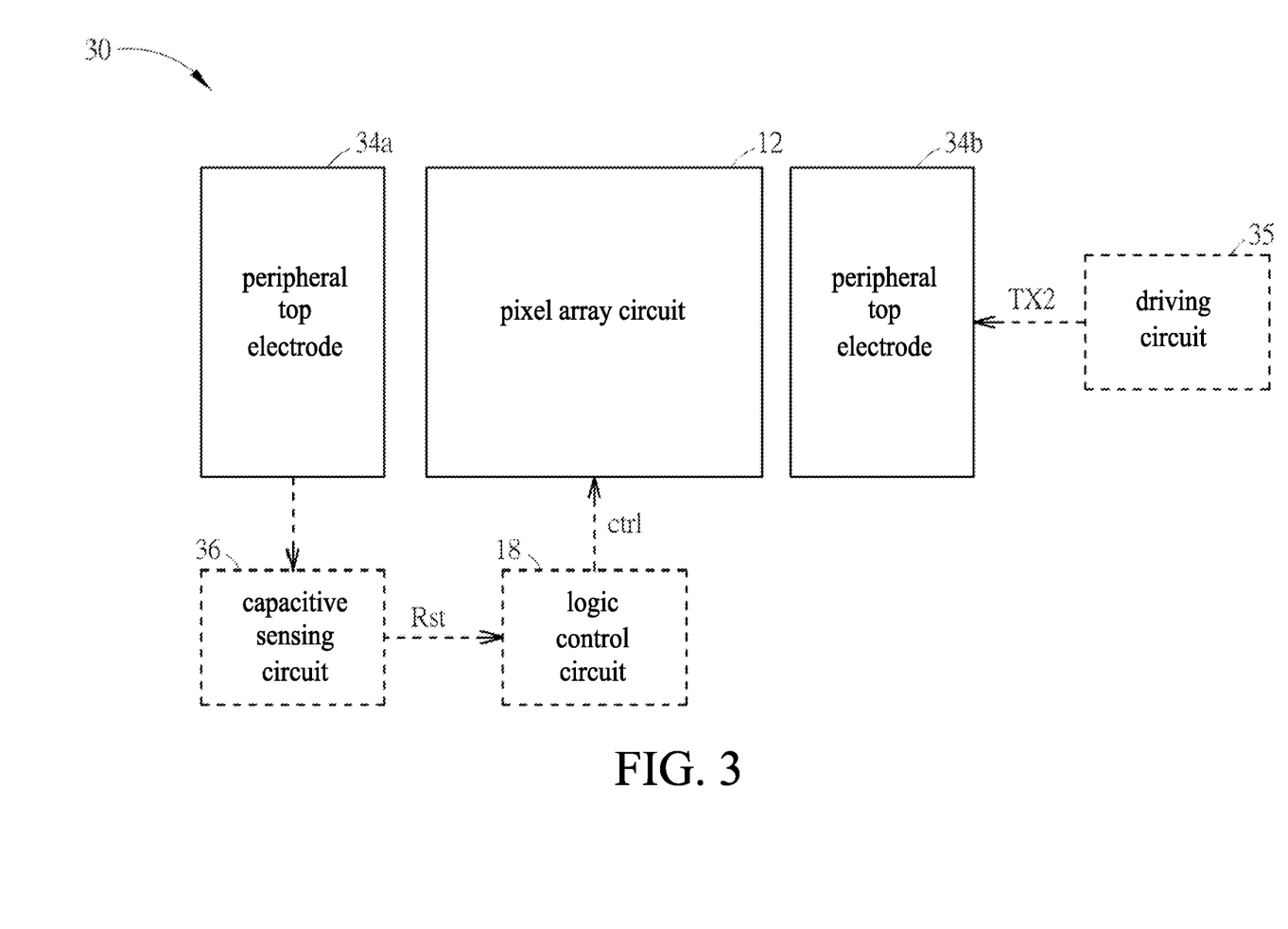
FIG. 3 is a schematic top view of a circuit layout of a fingerprint identification system according to an embodiment of the present disclosure.
Figure 4:
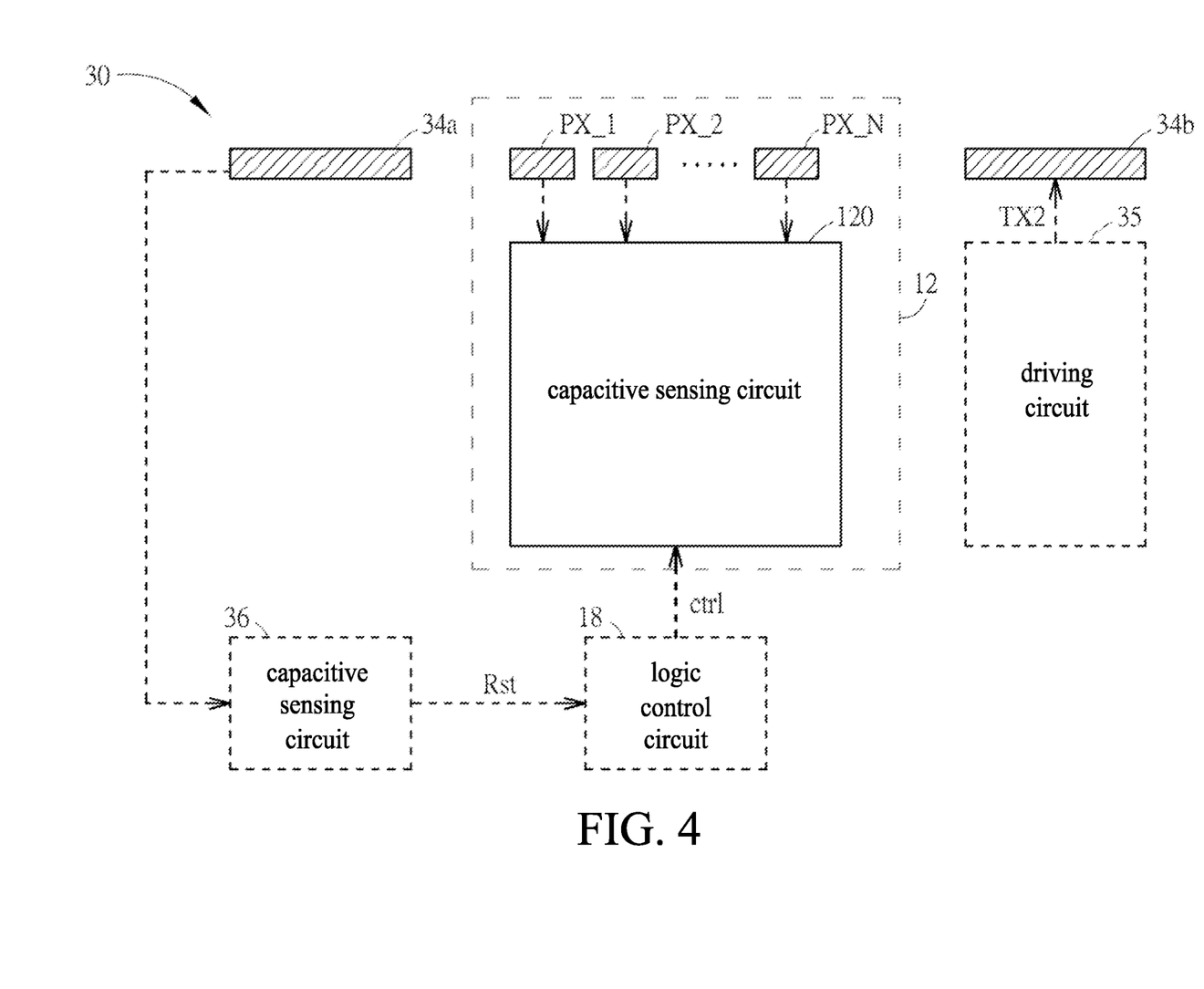
FIG. 4 is a schematic side view of the circuit layout of the fingerprint identification system shown in FIG. 3.

It should be noted that, the foregoing embodiments are used to explain the concept of the present disclosure, various modifications can be made by those skilled in the art based on the foregoing embodiments, and the disclosure is not limited to these embodiments. For example, reference is made to FIG. 3 and FIG. 4, wherein FIG. 3 is a schematic top view of a circuit layout of a fingerprint identification system 30 according to an embodiment of the present disclosure, and FIG. 4 is a schematic side view of the circuit layout of the fingerprint identification system 30. The fingerprint identification system 30 is similar to the fingerprint identification system 10, and the same parts are therefore denoted by the same reference signs. As compared with the fingerprint identification system 10, the fingerprint identification system 30 includes a peripheral top electrode 34a and a peripheral top electrode 34b, and the peripheral top electrode 34a and the peripheral top electrode 34b are respectively arranged on a first side and a second side of the pixel array circuit 12. For example, the second side is a side opposite to the first side. The peripheral top electrode 34a is coupled to a capacitive sensing circuit 36, and the peripheral top electrode 34b is coupled to a driving circuit 35. In an embodiment, a driving signal TX2 can be generated for the peripheral top electrode 34b by the fingerprint identification system 30 using the driving circuit 35 at a third time in the sleep mode; the change of the mutual capacitance between the peripheral top electrode 34a and the peripheral top electrode 34b can be sensed by the capacitive sensing circuit 36 at a fourth time in the sleep mode, and a sensing result Rst is generated accordingly. At this point, the logic control circuit 18 can determine whether the fingerprint identification system 30 is touched by the finger according to the sensing result Rst, and then generate the control signal ctrl according to the determination result. Other operation principle and details of the fingerprint identification system 30 are similar to those of the fingerprint identification system 10, and therefore are not repeated any more. The difference is that the capacitive sensing circuit 16 is used to sense the capacitance between the peripheral top electrode 14 and the ground terminal in the fingerprint identification system 10, whereas the capacitive sensing circuit 36 is used to sense the mutual capacitance between the peripheral top electrode 34a and the peripheral top electrode 34b in the fingerprint identification system 30.

Figure 5:
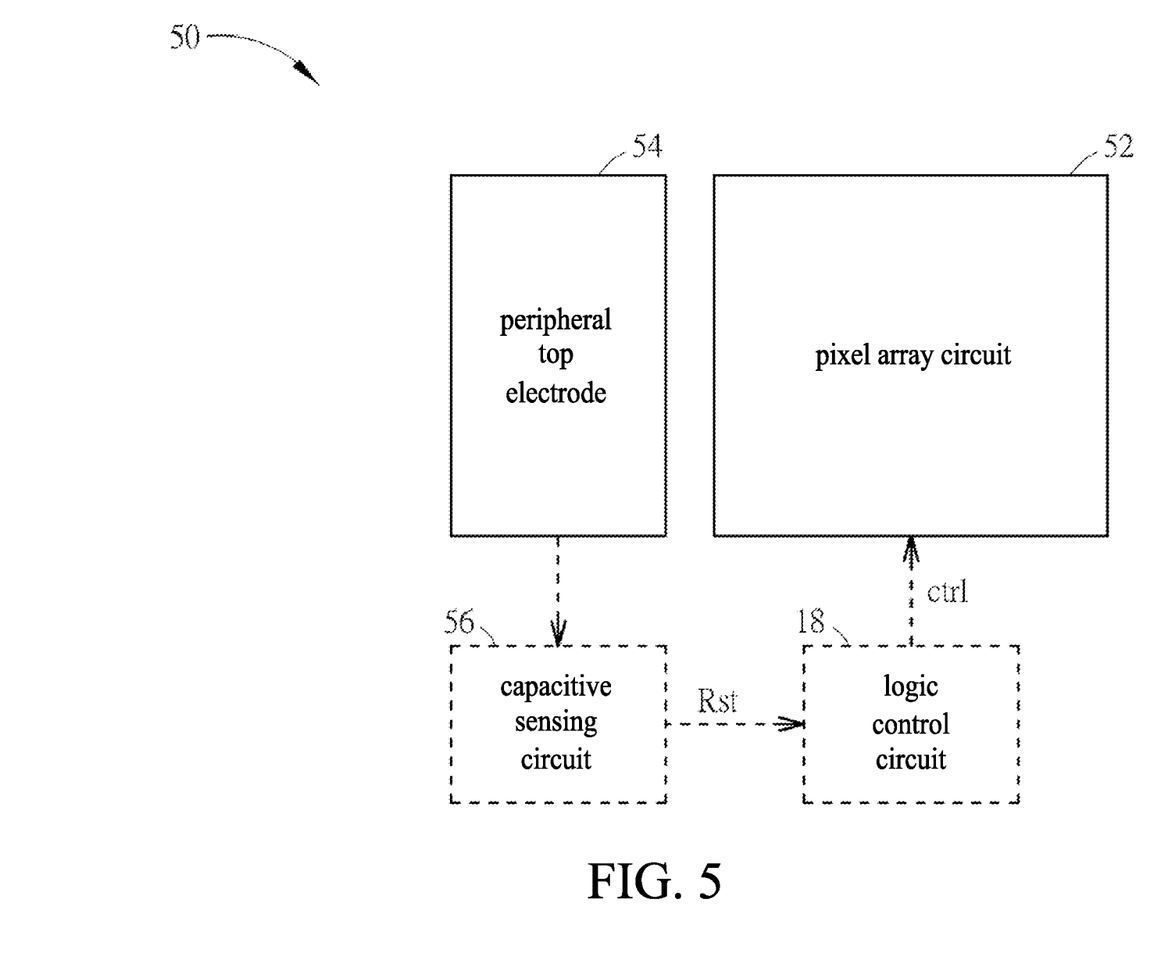
FIG. 5 is a schematic top view of a circuit layout of a fingerprint identification system according to an embodiment of the present disclosure.
Figure 6:
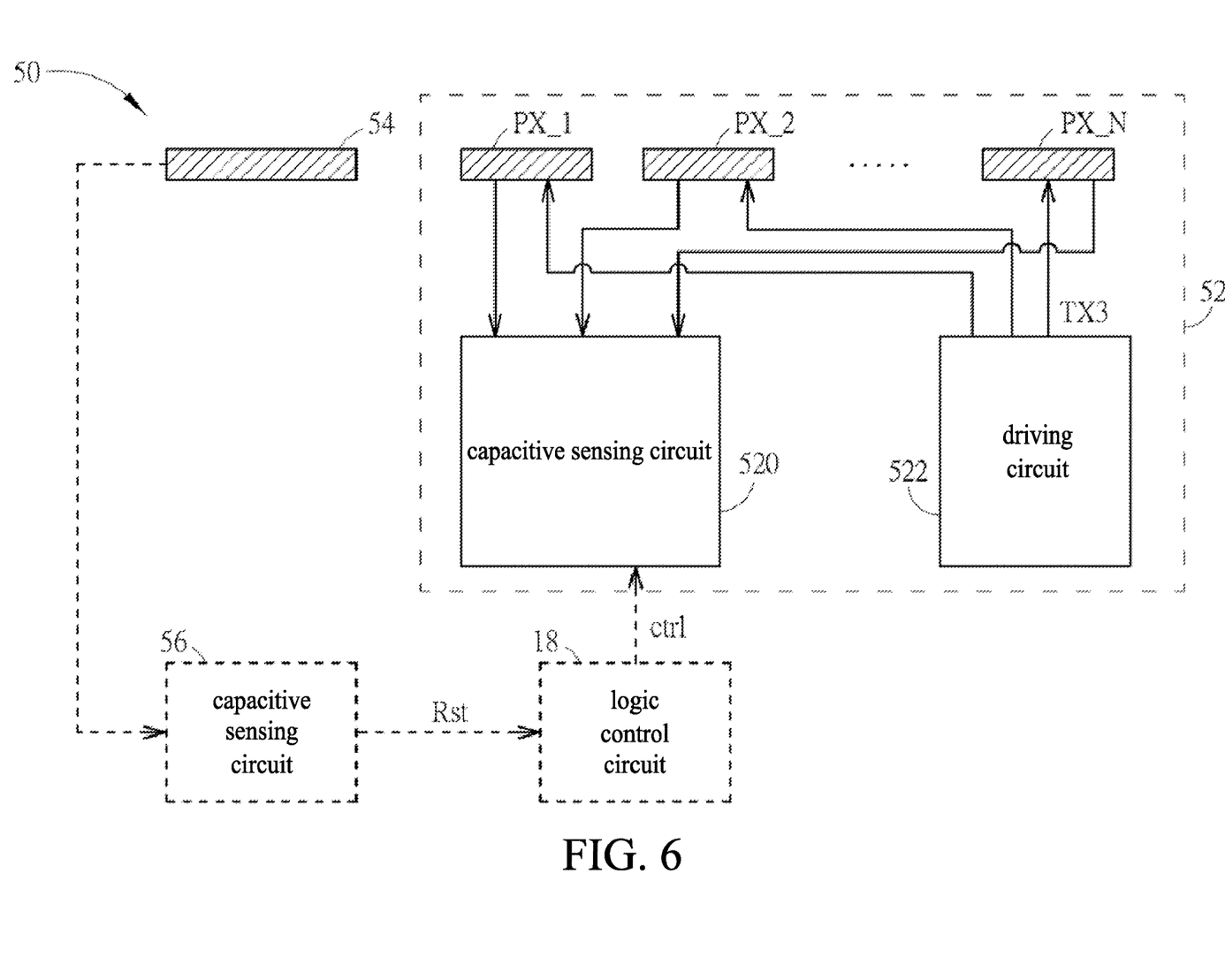
FIG. 6 is a schematic side view of the circuit layout of the fingerprint identification system shown in FIG. 5.

In addition, reference is made to FIG. 5 and FIG. 6, wherein FIG. 5 is a schematic top view of a circuit layout of a fingerprint identification system 50 according to an embodiment of the present disclosure, and FIG. 6 is a schematic side view of the circuit layout of the fingerprint identification system 50. The fingerprint identification system 50 includes a pixel array circuit 52, a peripheral top electrode 54, a capacitive sensing circuit 56, and a logic control circuit 18. The pixel array circuit 52 includes pixel top electrodes PX_1 to PX_N, a capacitive sensing circuit 520 and a driving circuit 522. In an embodiment, a driving signal TX3 can be generated for the pixel top electrodes PX_1 to PX_N by the fingerprint identification system 50 using the driving circuit 522 at a fifth time in the sleep mode; the change of the mutual capacitances between the peripheral top electrode 54 and the pixel top electrodes PX_1 to PX_N can be sensed by the capacitive sensing circuit 56 at a sixth time in the sleep mode, and a sensing result Rst is generated accordingly. At this point, the logic control circuit 18 can determine whether the fingerprint identification system 50 is touched by the finger according to the sensing result Rst, and then generate the control signal ctrl according to the determination result. Other operation principle and details of the fingerprint identification system 50 is similar to those of the fingerprint identification system 10 and 30, and therefore are not repeated any more. The difference is that the capacitive sensing circuit 36 is used to sense the mutual capacitance between the peripheral top electrode 34a and the peripheral top electrode 34b in the fingerprint identification system 30, whereas the capacitive sensing circuit 56 is used to sense the mutual capacitances between the peripheral top electrode 54 and the pixel top electrodes PX_1 to PX_N in the fingerprint identification system 50.

Figure 7:
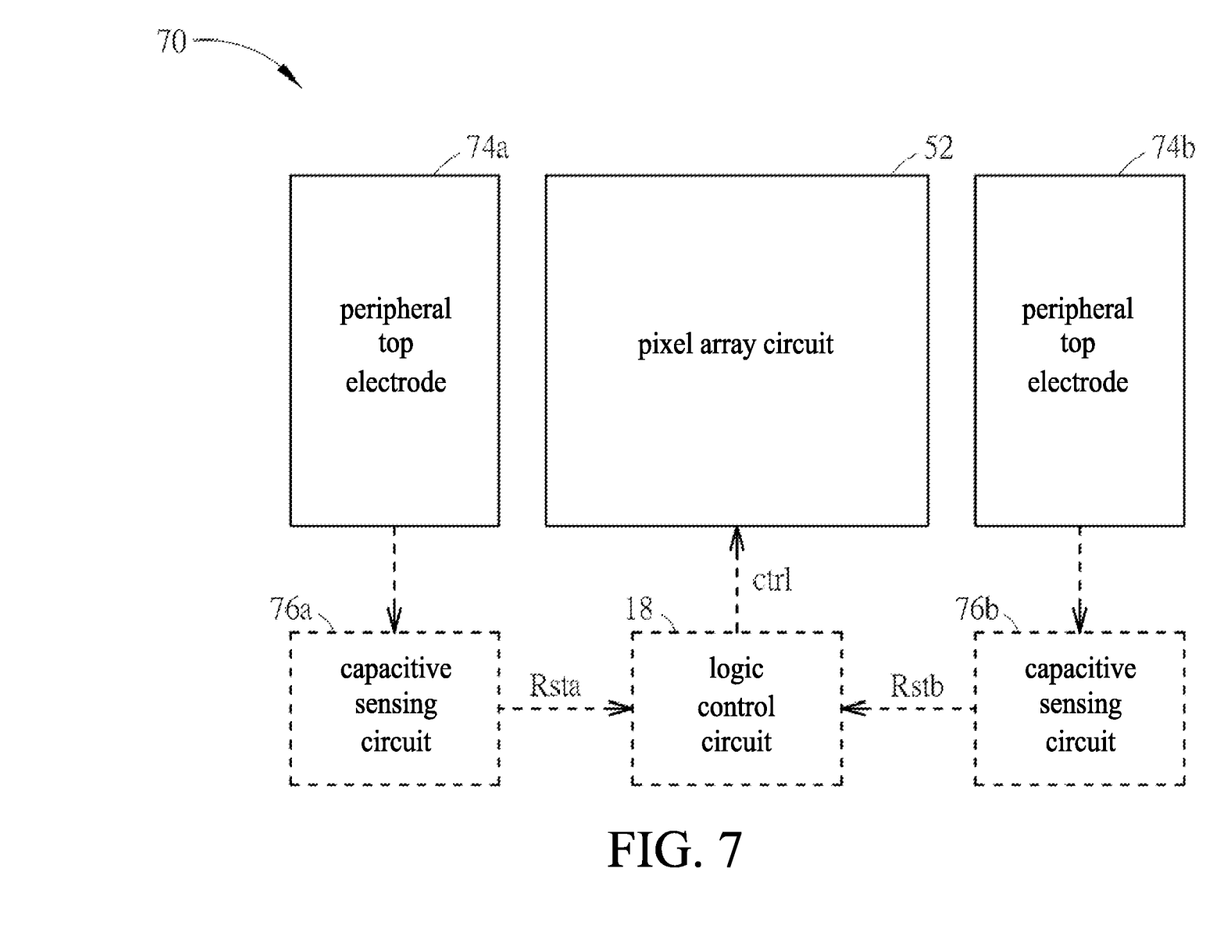
FIG. 7 is a schematic top view of a circuit layout of a fingerprint identification system according to an embodiment of the present disclosure.
Figure 8:
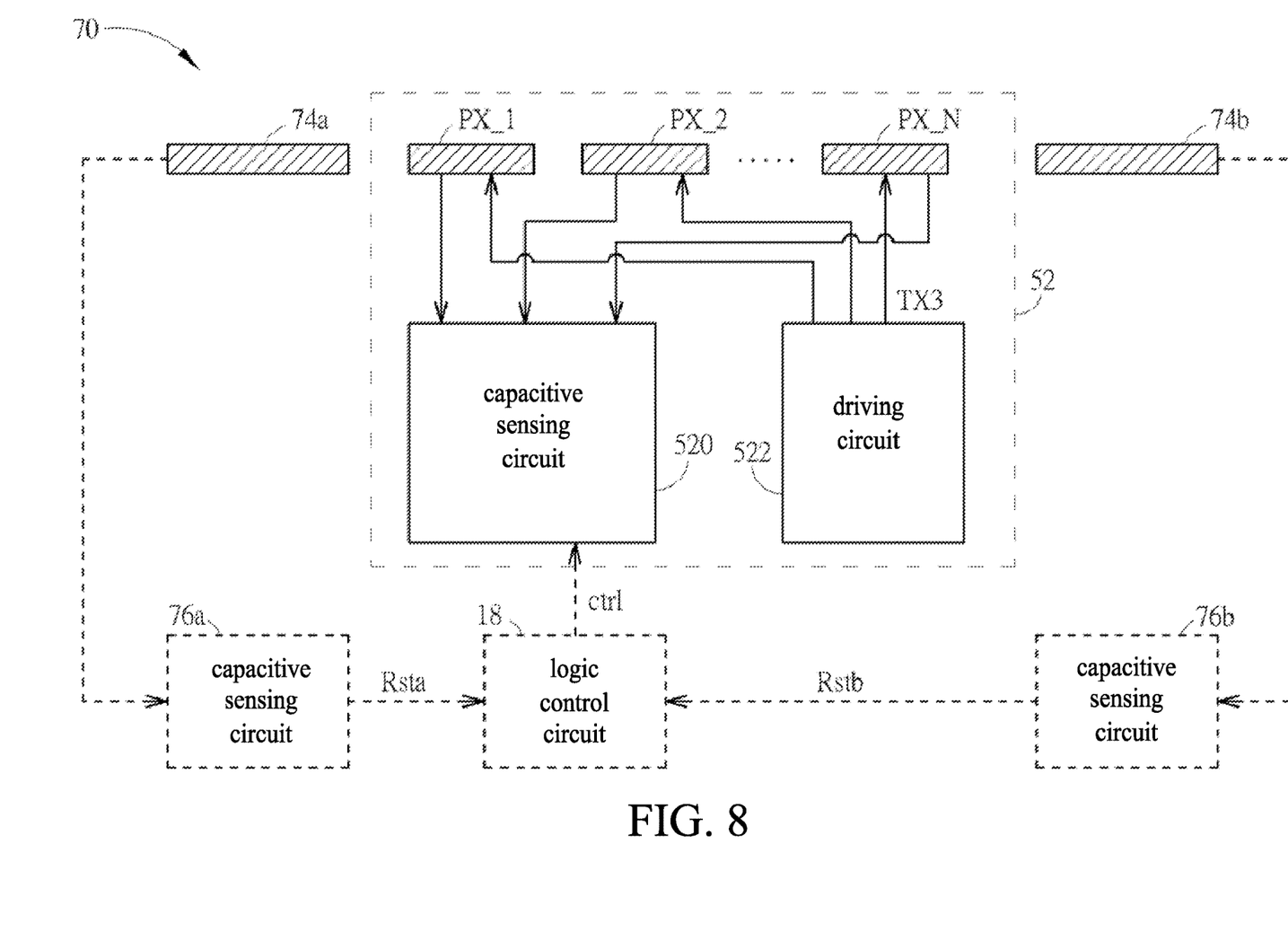
FIG. 8 is a schematic side view of the circuit layout of the fingerprint identification system shown in FIG. 7.

In addition, reference is made to FIG. 7 and FIG. 8, wherein FIG. 7 is a schematic top view of a circuit layout of a fingerprint identification system 70 according to an embodiment of the present disclosure, and FIG. 8 is a schematic side view of the circuit layout of the fingerprint identification system 70. The fingerprint identification system 70 is similar to the fingerprint identification system 50, and the same parts are therefore denoted by the same reference signs. As compared with the fingerprint identification system 50, the fingerprint identification system 70 includes peripheral top electrodes 74a and 74b and capacitive sensing circuits 76a and 76b, wherein the peripheral top electrode 74a and the peripheral top electrode 74b are respectively arranged on a first side and a third side of the pixel array circuit 52; for example, the third side is a side opposite to the first side. The capacitive sensing circuits 76a and 76b are respectively coupled to the peripheral top electrodes 74a and 74b and used for sensing the changes of the mutual capacitances between the peripheral top electrodes 74a and 74b and the pixel top electrodes PX_1 to PX_N, respectively.

The other operation principle and details of the fingerprint identification system 70 are similar to those of the fingerprint identification system 10, 30 and 50, and therefore are not repeated any more.

In summary, according to the present disclosure, the peripheral top electrodes are arranged on the periphery of the pixel array circuit, and the capacitive sensing circuit which is coupled to the peripheral top electrodes can sense the capacitance changes of the peripheral top electrodes in the sleep mode so as to determine whether the fingerprint identification system is touched by the user's finger. When the fingerprint identification system is touched by the user's finger, a control signal is generated by the logic control circuit so that the pixel array circuit is switched from the sleep mode to the normal operation mode, thus effecting power saving.

The above description merely relates to some embodiments of the present disclosure and is not intended to limit the present disclosure. Any change, equivalent substitution, improvements or the like made within the spirit and principles of the present disclosure should be considered as falling within the scope of protection of the present disclosure.

What is claimed is:

1. A fingerprint identification system, comprising:
a pixel array circuit, wherein the pixel array circuit is switched to a normal operation mode in response to a control signal, and the pixel array circuit includes:
a plurality of pixel top electrodes, arranged for receiving contact of a finger, the plurality of pixel top electrodes being arranged in an array; and
a third capacitive sensing circuit, coupled to the plurality of pixel top electrodes, wherein the third capacitive sensing circuit is used for sensing contact capacitance between the plurality of pixel top electrodes and the finger in the normal operation mode, so as to allow the fingerprint identification system to determine that each of the pixel top electrodes corresponds to a finger ridge or a finger valley to generate a fingerprint identification result corresponding to the finger;
a first peripheral top electrode, arranged at a first side of the pixel array circuit;
a first capacitive sensing circuit, coupled to the first peripheral top electrode, the first capacitive sensing circuit being used for sensing capacitance associated with the first peripheral top electrode in a sleep mode and generating a sensing result;
a logic control circuit, coupled to the first capacitive sensing circuit, the logic control circuit being used for generating the control signal according to the sensing result;
a third peripheral top electrode, arranged at a third side of the pixel array circuit; and
a fourth capacitive sensing circuit, coupled to the third peripheral top electrode;
wherein when the sensing result indicates that the first peripheral top electrode is coupled by a finger, the logic control circuit generates the control signal, and the pixel array circuit is switched from the sleep mode into the normal operation mode accordingly;
wherein in the normal operation mode, the pixel array circuit performs fingerprint identification with respect to a finger; and
wherein the first capacitive sensing circuit is used to sense mutual capacitance between the third peripheral top electrode and the plurality of pixel top electrodes in the sleep mode.

2. The fingerprint identification system of claim 1, further comprising a peripheral circuit arranged below the first peripheral top electrode.

3. The fingerprint identification system of claim 1, further comprising:
a first driving circuit, arranged for generating a first driving signal to the first peripheral top electrode in the sleep mode,
wherein the first capacitive sensing circuit senses capacitance between the first peripheral top electrode and a ground terminal in the sleep mode.

4. The fingerprint identification system of claim 1, further comprising:
a second peripheral top electrode, arranged at a second side of the pixel array circuit.

5. The fingerprint identification system of claim 4, further comprising:
a second driving circuit, coupled to the second peripheral top electrode, the second driving circuit being used for generating a driving signal to the second peripheral top electrode in the sleep mode;
wherein the first capacitive sensing circuit senses a mutual capacitance between the first peripheral top electrode and the second peripheral top electrode in the sleep mode.

6. The fingerprint identification system of claim 4, wherein the second side is opposite to the first side.

7. The fingerprint identification system of claim 1, further comprising:
a third driving circuit, coupled to the plurality of pixel top electrodes, the third driving circuit being used for generating a third driving signal to the plurality of pixel top electrodes in the sleep mode,
wherein the first capacitive sensing circuit is used to sense mutual capacitance between the first peripheral top electrode and the plurality of pixel top electrodes in the sleep mode.

8. The fingerprint identification system of claim 1, wherein after the fingerprint identification result is generated by the fingerprint identification system, the pixel array circuit enters the sleep mode.

9. The fingerprint identification system of claim 1, wherein the third capacitive sensing circuit is disabled in the sleep mode.

10. The fingerprint identification system of claim 1, wherein the third side is opposite to the first side.

11. The fingerprint identification system of claim 1, wherein the first peripheral top electrode is formed in a same integrated circuit as the pixel array circuit, and is located at an uppermost metal layer of a circuit layout of the integrated circuit.

12. The fingerprint identification system of claim 1, wherein the first peripheral top electrode and the pixel top electrodes are arranged at an uppermost metal layer of a circuit layout of an integrated circuit in which the pixel array circuit is included.

13. A fingerprint identification system, comprising:
a pixel array circuit;
at least one peripheral electrode arranged in a same integrated circuit as the pixel array circuit;
a capacitive sensing circuit coupled to the at least one peripheral electrode, for sensing a capacitance associated with the peripheral electrode in a sleep model; and
a logic control circuit coupled to the capacitive sensing circuit, for generating a control signal according to a sensing result of the capacitive sensing circuit;
wherein when the sensing result indicates that the at least one peripheral electrode is coupled by a finger, the logic control circuit generates the control signal, and the pixel array circuit is switched from a sleep mode into a normal operation mode;
wherein the pixel array circuit comprises a plurality of pixel electrodes, the peripheral electrode and the pixel electrodes are arranged at an uppermost layer of a circuit layout of the integrated circuit; and
wherein the at least one peripheral electrode comprises a first peripheral electrode and a second peripheral electrode; the fingerprint identification system further comprises a first driving circuit for generating a first driving signal to the first peripheral electrode in the sleep mode, and a second driving circuit for generating a second driving signal to the second peripheral electrode in the sleep mode; wherein the capacitive sensing circuit senses a mutual capacitance between the first peripheral electrode and the second peripheral electrode in the sleep mode.

14. The fingerprint identification system of claim 13, further comprising a driving circuit arranged for generating a driving signal to the at least one peripheral electrode in the sleep mode; wherein the capacitive sensing circuit senses capacitance between the at least one peripheral electrode and a ground terminal in the sleep mode.

15. The fingerprint identification system of claim 13, further comprising a driving circuit for generating a driving signal to the at least one peripheral electrode in the sleep mode; wherein the capacitive sensing circuit senses a mutual capacitance between the at least one peripheral electrode and the plurality of pixel top electrodes in the sleep mode.

16. A fingerprint identification system, comprising:
a pixel array circuit, wherein the pixel array circuit is switched to a normal operation mode in response to a control signal, and the pixel array circuit includes:
    a plurality of pixel top electrodes, arranged for receiving contact of a finger, the plurality of pixel top electrodes being arranged in an array; and
    a third capacitive sensing circuit, coupled to the plurality of pixel top electrodes, wherein the third capacitive sensing circuit is used for sensing contact capacitance between the plurality of pixel top electrodes and the finger in the normal operation mode, so as to allow the fingerprint identification system to determine that each of the pixel top electrodes corresponds to a finger ridge or a finger valley to generate a fingerprint identification result corresponding to the finger;
a first peripheral top electrode, arranged at a first side of the pixel array circuit;
a first capacitive sensing circuit, coupled to the first peripheral top electrode, the first capacitive sensing circuit being used for sensing capacitance associated with the first peripheral top electrode in a sleep mode and generating a sensing result;
a logic control circuit, coupled to the first capacitive sensing circuit, the logic control circuit being used for generating the control signal according to the sensing result; and
a third driving circuit, coupled to the plurality of pixel top electrodes, the third driving circuit being used for generating a third driving signal to the plurality of pixel top electrodes in the sleep mode,
wherein when the sensing result indicates that the first peripheral top electrode is coupled by a finger, the logic control circuit generates the control signal, and the pixel array circuit is switched from the sleep mode into the normal operation mode accordingly;
wherein in the normal operation mode, the pixel array circuit performs fingerprint identification with respect to a finger; and
wherein the first capacitive sensing circuit is used to sense mutual capacitance between the first peripheral top electrode and the plurality of pixel top electrodes in the sleep mode.

* * * * *